(12) United States Patent
Suzuki

(10) Patent No.: US 7,535,410 B2
(45) Date of Patent: May 19, 2009

(54) WEIGHT CALCULATION METHOD, WEIGHT CALCULATION DEVICE, ADAPTIVE ARRAY ANTENNA, AND RADAR DEVICE

(75) Inventor: Junichiro Suzuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/782,933

(22) Filed: Jul. 25, 2007

(65) Prior Publication Data
US 2008/0150794 A1  Jun. 26, 2008

(30) Foreign Application Priority Data
Jul. 26, 2006  (JP)  ............... 2006-203692

(51) Int. Cl.
G01S 7/40 (2006.01)
G01S 13/522 (2006.01)
G01S 7/28 (2006.01)
H01Q 3/26 (2006.01)
G01S 13/00 (2006.01)
H01Q 3/00 (2006.01)

(52) U.S. Cl. ............... 342/162; 342/73; 342/74; 342/81; 342/159; 342/160; 342/165; 342/173; 342/175; 342/195; 342/368; 342/377

(58) Field of Classification Search ........... 342/13–20, 342/73–82, 89, 98–103, 147–158, 175, 195, 342/368–377, 159–174, 90, 91, 378–384
See application file for complete search history.

(56) References Cited

U.S. PATENT DOCUMENTS 4,117,538 A * 9/1978 Shrader et al. ............ 342/91
4,217,586 A * 8/1980 McGuffin ................. 342/380
4,417,249 A * 11/1983 Zscheile, Jr. ............. 342/379
4,608,701 A * 8/1986 Burgers et al. ............ 342/368

(Continued)

FOREIGN PATENT DOCUMENTS

JP  6-196921  7/1994

(Continued)

OTHER PUBLICATIONS

J. Scott Goldstein, et al., "A Multistage Representation of the Wiener Filter Based on Orthogonal Projections," IEEE Transactions on Information Theory, vol. 44, No. 7, Nov. 1998, pp. 2943-2959.

Primary Examiner—Bernarr E Gregory
(74) Attorney, Agent, or Firm—Oblon, Spivak, McClelland, Maier & Neustadt, P.C.

(57) ABSTRACT

A weight calculation method begins by storing a target reflection signal of a radar pulse received via an antenna in cells corresponding to positions along with a reception timing for a plurality of processing range cells having lengths equivalent to prescribed ranges on a time axis. The method continues by calculating weights by stage for the phase and amplitude of the target reflection signal to form a reception composite beam so that arrival directions of spurious elements become zero to an arrival direction of the target reflection signal by using values stored in the plurality of processing cells. The calculating of the weights monitors changes of specific variables indicating correlation values among stages in the plurality of processing stages to stop a shift to the next processing stage at the time when the variables exceed a reference value.

8 Claims, 4 Drawing Sheets

U.S. PATENT DOCUMENTS

| | | | |
|---|---|---|---|
| 5,018,065 A * | 5/1991 | McWhirter et al. | 342/375 |
| 5,028,931 A * | 7/1991 | Ward | 342/383 |
| 5,218,359 A * | 6/1993 | Minamisono | 342/383 |
| 5,274,844 A * | 12/1993 | Harrison et al. | 342/368 |
| 5,294,933 A * | 3/1994 | Lee et al. | 342/159 |
| 5,561,667 A * | 10/1996 | Gerlach | 342/373 |
| 5,767,806 A * | 6/1998 | Watanabe et al. | 342/373 |
| 5,854,612 A * | 12/1998 | Kamiya et al. | 342/383 |
| 6,049,307 A * | 4/2000 | Lim | 342/383 |
| 6,087,986 A * | 7/2000 | Shoki et al. | 342/383 |
| 6,130,643 A * | 10/2000 | Trippett et al. | 342/380 |
| 6,166,690 A * | 12/2000 | Lin et al. | 342/383 |
| 6,188,915 B1 * | 2/2001 | Martin et al. | 342/378 |
| 6,369,758 B1 * | 4/2002 | Zhang | 342/383 |
| 6,392,596 B1 * | 5/2002 | Lin et al. | 342/378 |
| 6,462,709 B1 * | 10/2002 | Choi | 342/378 |
| 6,509,872 B2 * | 1/2003 | Ishii et al. | 342/383 |
| 6,618,007 B1 * | 9/2003 | Miller | 342/375 |
| 6,633,265 B2 * | 10/2003 | Hirabe | 342/372 |
| 6,667,712 B2 * | 12/2003 | Ericson et al. | 342/154 |
| 6,771,219 B2 * | 8/2004 | Sim | 342/382 |
| 6,867,735 B2 * | 3/2005 | Song et al. | 342/377 |

FOREIGN PATENT DOCUMENTS

| | | |
|---|---|---|
| JP | 2005-189171 | 7/2005 |

* cited by examiner

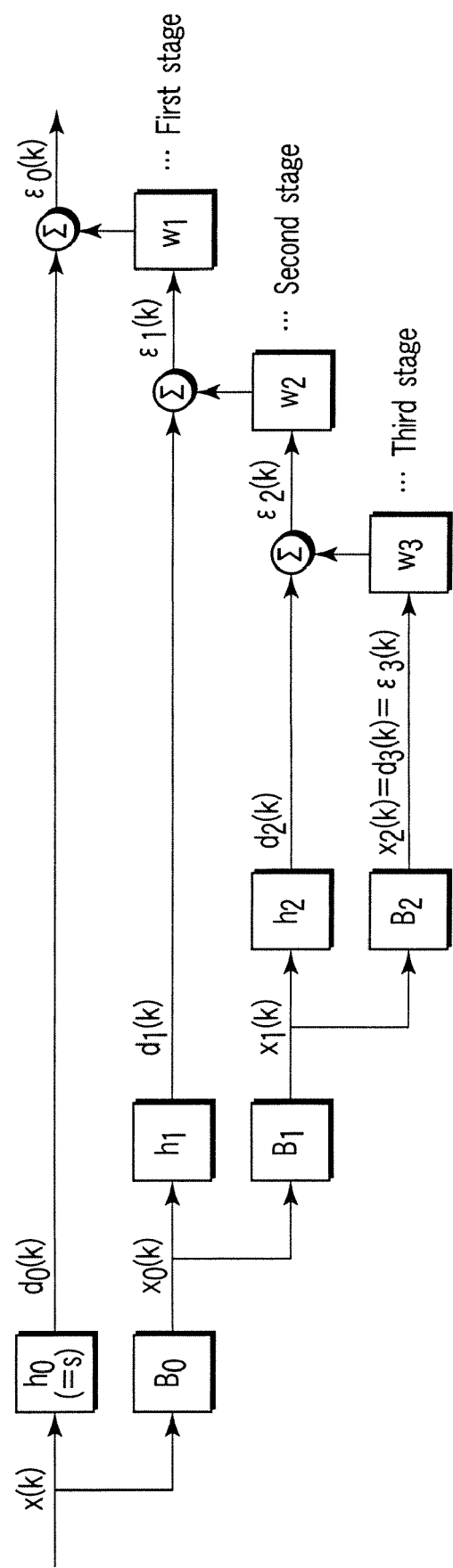
F I G. 1

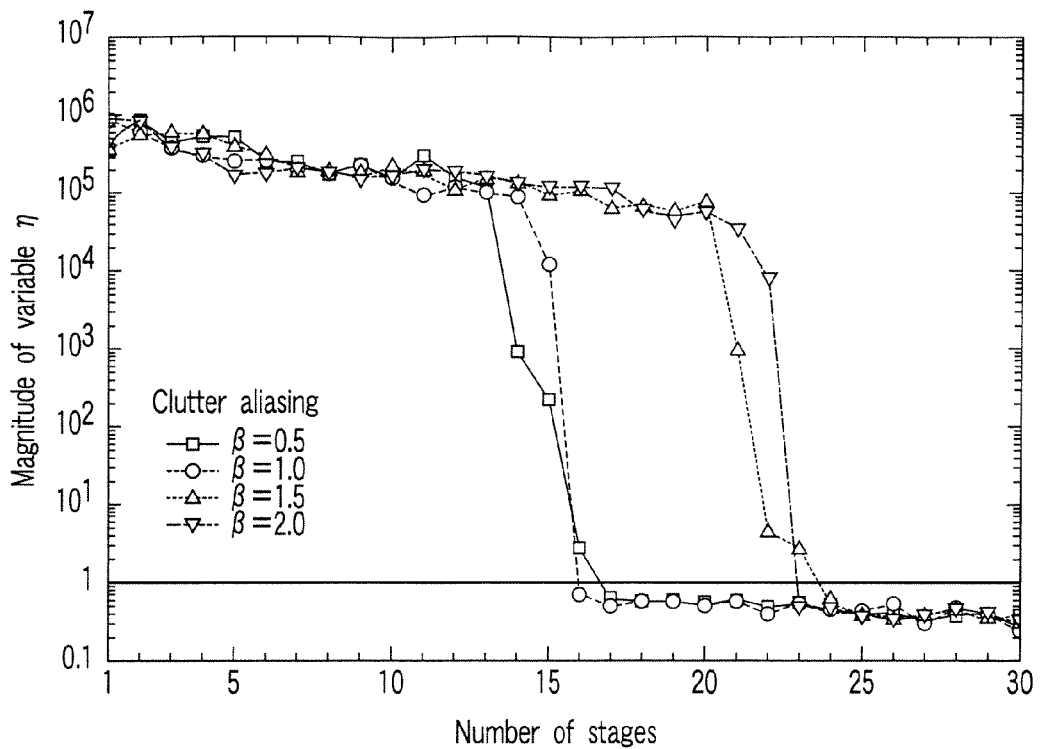
F I G. 4
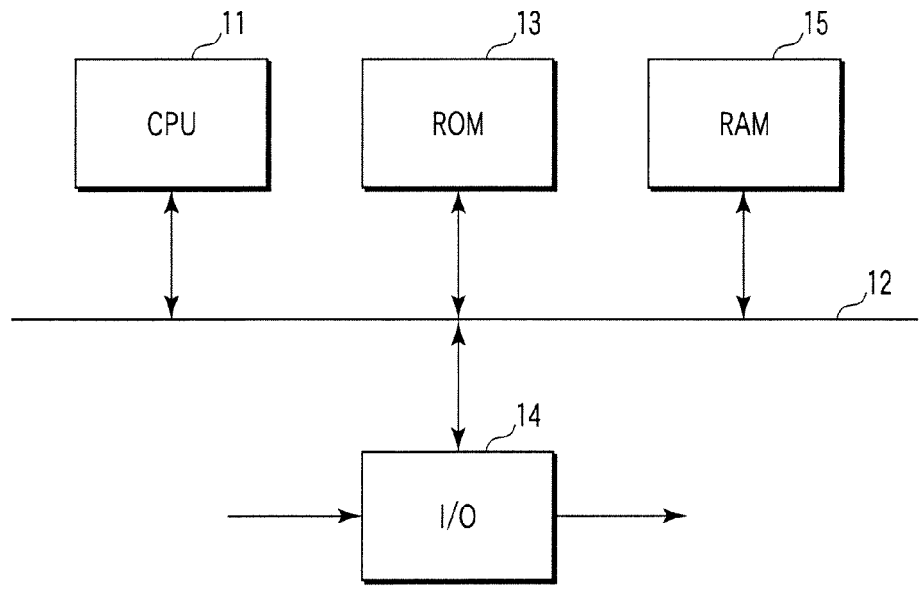
F I G. 5

WEIGHT CALCULATION METHOD, WEIGHT CALCULATION DEVICE, ADAPTIVE ARRAY ANTENNA, AND RADAR DEVICE

CROSS-REFERENCE TO RELATED APPLICATIONS

This application is based upon and claims the benefit of priority from prior Japanese Patent Application No. 2006-203692, filed Jul. 26, 2006, the entire contents of which are incorporated herein by reference.

BACKGROUND OF THE INVENTION

1. Field of the Invention

The present invention relates to a weight calculation method appropriate to suppress spurious elements to detect a reflection signal from a target by means of weight control, a weight calculation device using the weight calculation method, an adaptive array antenna making use of the weight calculation device, and a radar device with the built-in adaptive array antenna.

2. Description of the Related Art

In recent years, an adaptive array antenna has been built into a pulse radar device to carry out so-called adaptive null steering in order to improve target detection precision. The adaptive null steering is a type of processing to form a reception composite beam so that direction-of-arrival (DOA) of unnecessary waves become a null directivity by applying weight control to the phase and amplitude of a reception signal at the adaptive array antenna. For the adaptive array antenna to be used for such a use, it is required to perform the weight control so as to properly form the reception composite beam even under an environment in which a large number of delay signals arrive, or under an environment in which spurious elements such as clutter and interference waves exist.

In the adaptive array antenna, therefore, a weight control method employing a space time adaptive processing (STAP) system has been widely applied. The STAP system has a distinctive feature to improve a signal to interference plus noise ratio (SINR) and enable forming an excellent beam in which directivity in arrival directions of spurious elements are almost zero (null).

The STAP system conducts the following processing. At first, antennas (element antennas, namely channels) in which a plurality of (M pieces of) antennas are arranged in an array form receive targeted reflection signals, and store the reception signals at corresponding cell positions in all processing range cells in which range cells corresponding to reception pulse widths are formed so as to be ranged with prescribed lengths on a time axis. The STAP system carries out an arithmetic operation for a covariance matrix from data of range cells except for range cells (referred to as processing adaptive range cells) in which it is presumed that the target reflection signals are included, namely from data of cells which are supposed to be formed only of spurious elements. Thereafter, the STAP system applies weight control to the antenna reception signals through a beam forming circuit with the use of adaptive weights calculated on the basis of the covariance matrix.

In the weight control in the STAP system, weight calculation for each range cell is performed in a weight calculation circuit so as to calculate the adaptive weights. As to the weight calculation, a multistage wiener filter (MWF) system has been known as a method therefore. In terms of the MWF system, its details are disclosed in the publication entitled IEEE TRANSACTIONS ON INFORMATION THEORY, VOL. 44, No. 7, NOVEMBER 1998 "A Multistage Representation of the Wiener Filter Based on Orthogonal Projections".

However, despite the fact the reference document related to the foregoing MWF system discloses the weight calculation method to suppress the DOA of unnecessary waves, it does not describe about a decision method of the number of processing stages in the case of application of the weight calculation method. Conventionally, therefore, since a system to decide the processing stages by determining the covariance matrix calculated from the obtained data from a magnitude of an eigenvalue obtained through eigenvalue decomposition is required, this involves excessive calculation.

BRIEF SUMMARY OF THE INVENTION

A weight calculation method regarding the first aspect of the present invention begins by storing a target reflection signal of a radar pulse received via an antenna in cells corresponding to positions along with a reception timing for a plurality of processing range cells having lengths equivalent to prescribed ranges on a time axis. The method continues by calculating weights by stage for the phase and amplitude of the target reflection signal to form a reception composite beam so that arrival directions of spurious elements become zero to an arrival direction of the target reflection signal by using values stored in the plurality of processing cells. The calculating of the weights monitors changes of specific variables indicating correlation values among stages in the plurality of processing stages to stop a shift to the next processing stage at the time when the variables exceed a reference value.

A weight calculation device regarding the second aspect of the present invention includes a storage unit and a weight calculation unit. The storage unit stores a target reflection signal of a radar pulse received via an antenna at corresponding cell positions along with a reception timing to a plurality of processing range cells having lengths equivalent to prescribed ranges on a time axis. The weight calculation unit calculates weights by stage for the phase and amplitude of the target reflection signal to form a reception composite beam so that arrival directions of spurious elements become zero to an arrival direction of the target reflection signal by using values stored in the plurality of processing cells. The weight calculation unit monitors changes of specific variables indicating correlation values among stages in the plurality of processing stages to stop a shift to the next processing stage at the time when the variables exceed a reference value.

An adaptive array antenna regarding the third aspect of the present invention arranges a plurality of element antennas in an array form and is directivity-controlled in an arbitrary direction to receive a target reflection signal of a radar pulse. The adaptive array antenna includes a storage unit, a weight calculation unit, and a beam forming unit. The storage unit stores the target reflection signal at positions of corresponding cells along with a reception timing for a plurality of processing range cells having lengths equivalent to prescribed ranges on a time axis. The weight calculation unit calculates weights by stage for the phase and amplitude of the target reflection signal to form a reception composite beam so that arrival directions of spurious elements become zero to an arrival direction of the target reflection signal by using values stored in the plurality of processing cells. The beam forming unit takes in the adaptive weights, and performs weight control for the target reflection signal in use of the adaptive weights to form a reception composite beam.

A radar device regarding the fourth aspect of the present invention includes an adaptive array antenna, a weight calculation unit, and a signal processing unit. The adaptive array antenna arranges a plurality of element antennas in an array form and is directivity-controlled in an arbitrary direction to receive a target reflection signal of a radar pulse. The weight calculation unit stores the target reflection signal at positions of corresponding cells along with a reception timing for a plurality of processing range cells having lengths equivalent to prescribed ranges on a time axis. The weight calculation unit also calculates weights by stage for the phase and amplitude of the target reflection signals to form a reception composite beam so that arrival directions of spurious elements become zero to an arrival direction of the target reflection signal by using values stored in the plurality of processing cells. The weight calculation unit further monitors changes of specific variables indicating correlation values among stages at each of the plurality of processing stages. The weight calculation unit still further stops a shift to the next stage at the time when the variable exceeds a reference value to obtain adaptive weights. The signal processing unit detects a target from the target reflection signal to which weight control is applied by the adaptive array antenna.

Additional objects and advantages of the invention will be set forth in the description which follows, and in part will be obvious from the description, or may be learned by practice of the invention. The objects and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 depicts an example flow of processing of a weight calculation method in an MWF system described in the aforementioned reference document;

FIG. 4 depicts example characteristics depicting by comparing the change of the magnitude of the eigenvalue calculated means of the eigenvalue decomposition to a change of a variable $\eta_n$ regarding the embodiments;

FIG. 5 is a block diagram depicting an embodiment of a weight calculation device regarding the embodiments; and FIG. 6 is a schematic block configuration diagram of a radar device having a weight calculation device, in an STAP (space time adaptive processing) system with the invention applied thereto, built-in.

DETAILED DESCRIPTION OF THE INVENTION

Figure 2:
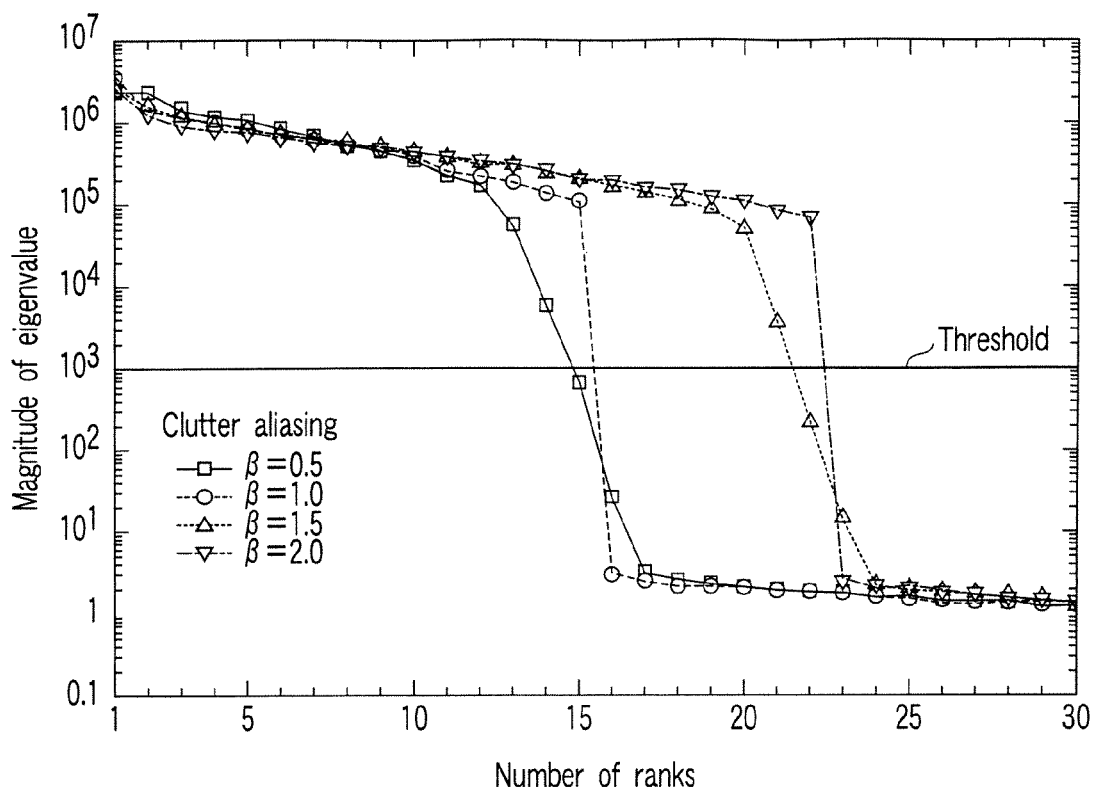
FIG. 2 depicts example characteristics depicting a change of a magnitude of an eigenvalue calculated by means of eigenvalue decomposition.

Embodiments of the present invention will be described with reference to the drawings.

An MFW (multistage wiener filter) system as a method of the weight calculation disclosed by the aforementioned reference document will be firstly set forth in the following description.

In the MWF system, when a direction matrix of an arrival direction of a reception signal X is A, a complex amplitude vector is S, and a thermal noise, given by an average 0 and a variance $\sigma^2$, is n, the reception signal X is represented by the following formula (1).

$$X = A \cdot S + n \tag{1}$$

When a targeted signal is received by M pieces of element antennas #m (m: 1 to M) arranged in an array form at intervals dx, and a wave length of a reception frequency signal is set to $\lambda(\Lambda)$, a steering vector "a $(\theta_d)$" is represented by the following formula (2).

$$a(\theta_d) = \begin{bmatrix} \exp\left(j\frac{2\pi}{\lambda}dx \cdot 0 \cdot \sin\theta_d\right) \\ \exp\left(j\frac{2\pi}{\lambda}dx \cdot 1 \cdot \sin\theta_d\right) \\ \vdots \\ \exp\left(j\frac{2\pi}{\lambda}dx \cdot (m-1) \cdot \sin\theta_d\right) \end{bmatrix} \tag{2}$$

A direction matrix $A_\theta$ is expressed by the following formula (3).

$$A_\theta = [a(\theta_1), a(\theta_2), \ldots, a(\theta_D)] \tag{3}$$

Therefore, a steering vector "a($f_d$)" to decide an arrival direction of the target signal d is expressed by the following formula (4).

$$a(f_d) = \begin{bmatrix} \exp\left(j2\pi \cdot \frac{0}{T} \cdot f_d\right) \\ \exp\left(j2\pi \cdot \frac{1}{T} \cdot f_d\right) \\ \vdots \\ \exp\left(j2\pi \cdot \frac{(l-1)}{T} \cdot f_d\right) \end{bmatrix} \tag{4}$$

Therefore, a direction matrix $A_f$ to a time series is represented by the following formula (5).

$$A_f = [a(f_1), a(f_2), \ldots, a(f_D)] \tag{5}$$

Thus, a direction matrix $A(\theta,f)$ is expressed, in the use of a space time steering vector "a($\theta_d, f_d$)" represented by the following formula (6), $$a(\theta_d, f_d) = \begin{bmatrix} \exp\left(j2\pi \cdot \frac{0}{T} \cdot f_d\right) \cdot a(\theta_d) \\ \exp\left(j2\pi \cdot \frac{1}{T} \cdot f_d\right) \cdot a(\theta_d) \\ \vdots \\ \exp\left(j2\pi \cdot \frac{(l-1)}{T} \cdot f_d\right) \cdot a(\theta_d) \end{bmatrix} \tag{6}$$

by the following formula (7).

$$A_{\theta,f} = [a(\theta_1, f_1), a(\theta_2, f_2), \ldots, a(\theta_D, f_D)] \tag{7}$$

Here, the weight calculation in the MWF system has been described in the reference document given above. FIG. 1 illustrates the flow of the processing of the weight calculation method in the MWF system described in the aforementioned reference document.

The processing shown in FIG. 1 carries out calculation processing of forward recursion and backward recursion in a plurality of processing stages.

The forward recursion processing carries out the following processing expressed by a formula (8).

$$\begin{cases} r_{x_i d_i} = E[x_i(k) d_i^*(k)] \\ d_{i+1}(k) = h_{i+1}^H x_i(k) \\ \delta_{i+1} = \sqrt{r_{x_i d_i}^H r_{x_i d_i}} \\ \sigma_{d_i}^2 = E[|d_i(k)|^2] \\ h_{i+1} = r_{x_i d_i}/\delta_{i+1} \\ x_{i+1}(k) = B_{i+1} x_i(k) \\ B_i = \text{null}(h_i) \end{cases} \quad (8)$$

wherein $r_{xi},d_j$ is a correlation vector of input vector $x_i(k)$ and desired signal $d_i(k)$ in i-th stage, $\delta_{i+1}$ is a variable indicating a magnitude of correlation vector $r_{xi},d_j$ in (i+1)-th stage, $h_{i+1}$ is a normalized vector of correlation vector $r_{xi},d_j$, $\sigma^2_{di}$ is the deviation of desired signal $d_i(k)$, $\epsilon_{i-1}(k)$ is an error signal at (i−1)-th stage, $B_i h_i = 0$ means "null".

Meanwhile, the backward recursion processing carries out the following processing expressed by a formula (9).

$$\begin{cases} w_i = \delta_i/\xi_i \\ \xi_i = \sigma_{d_{i-1}}^2 - w_i \delta_i \\ \xi_{i\,max} = \sigma_{d_i\,max}^2 \\ \varepsilon_{i-1}(k) = d_{i-1}^2 - w_i \varepsilon_i(k) \end{cases} \quad (9)$$

wherein $w_i$ is a variable in the i-th stage calculated by stage analysis of MWF, $\delta_i$ is a variable indicating a magnitude of correlation vector $r_{xi},d_j$ in (i−1)-th stage, $\epsilon_i$ is the least-squares error in the i-th stage.

Conventionally, a system has been employed, wherein the system determines the covariance matrix, calculated in accordance with the obtained data, from the magnitude of the eigenvalue obtained by executing eigenvalue decomposition thereto, and decides the number of processing stages for performing the weight calculation on the basis of the termination result. Therefore, excessive calculation has been needed.

As an example, a magnitude of an eigenvalue calculated through the eigenvalue decomposition in a system to decide the number of processing stages by means of the eigenvalue decomposition is shown in FIG. 2. Here, if an airplane velocity is $V_p$, an element interval is d, and a pulse repetition frequency is PRF, β indicating the magnitude of clutter aliasing is expressed as follows:

$\beta = 2 \times V_p/(d \times PRF)$

In this example, for instance, setting the magnitude of the eigenvalue at 30 dB as a determination reference enables the weight through the optimum number of the processing stages; however the deciding system cannot decide the number of processing stages until magnitudes of all eigenvalues are obtained. Thus, conventionally, excessive calculation was necessary.

Thus, the MWF weight calculation method regarding the present invention determines the magnitude of a variable $\eta_n$ calculated in weight derivation processes for each processing stage then automatically decides the number of processing stages to obtain the weight.

Here, the variable $\eta_n$ is decided by the following formula. At first, the aforementioned forward recursion equation leading the following formula (10), $$h_{i+1} = \frac{r_{x_i d_i}}{\delta_{i+1}} \quad (10)$$

$\delta_i$ is represented as follows:

$$\delta_i = h_i^H r_{x_{i-1} d_{i-1}} \quad (11)$$

In a similar manner, the forward recursion equation leading the following formula (12), $$\begin{cases} r_{x_i d_i} = E[x_i(k) d_i^*(k)] \\ d_{i+1}(k) = h_{i+1}^H x_i(k) \end{cases} \quad (12)$$

substituting the formula (12) into the formula (11), the following recursion formula (13) may be obtained.

$$\delta_i = E[h_i^H x_{i-1}(k) d_{i-1}^*(k)] \quad (13)$$
$$= E[d_i(k) d_{i-1}^*(k)]$$

The equation (13) represents an expected value of the cross-correlation between the ith and the (i−1)th stage desired signal. Therefore, when the value shows almost "1", it can be said that the two data are numerically stable. Furthermore, from the backward recursion, the following formula (14) may be obtained, $$\omega_i = \delta_i/\xi_i \quad (14)$$

Thus, the variable ηn may be expressed as following formula (15):

$$\eta_i = \xi_i \cdot \omega_i = \delta_i \leq 1 \quad (15)$$

As mentioned above, the variable η (=variable $\delta_n$) is expressed by the correlation value of the desired signals between the i-th stage and the (i−1)-th stage, so that when the correlation value between the stages becomes "1" or smaller, there is no meaning in stage analyses after the i-th stage. Therefore, it is obvious that the MWF system terminates its processing procedure.

Figure 3:
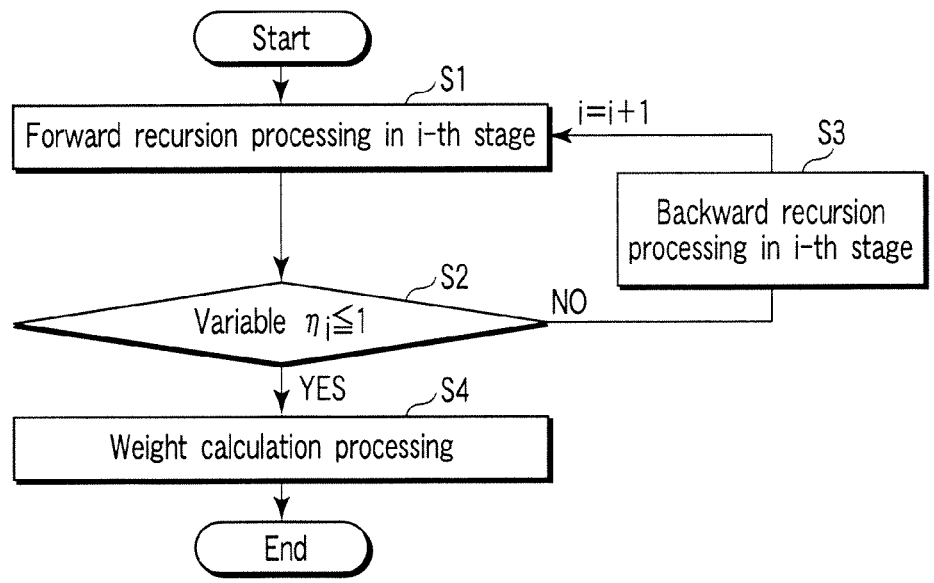
FIG. 3 is an example flowchart depicting a processing procedure of a weight calculation method regarding the embodiments.

FIG. 3 is a flowchart illustrating a processing procedure of the weight calculation method regarding the present invention. In FIG. 3, the calculation method firstly performs forward recursion processing in the i-th (initial value=1) stage (step S1), and, in succession, it determines whether the variable $\eta_i$ becomes smaller than a threshold α=1 at this moment (step S2), then, if the variable $\eta_i$ has not become smaller than the threshold α=1, it performs the backward processing of the i-th stage (step S3). The calculation method then returns to the step S1 to go to the next stage. In the step S2, if the variable $\eta_i$ has become smaller than the threshold α=1, it carries out the weight calculation processing (step S4).

Herein, the eigenvalue calculated through the eigenvalue decomposition, and the change of the variable $\eta_n$ calculated in the weight derivation process (M=8, N=8, and the number of pieces of sample data is 64) are shown in FIG. 4. As is clear from FIG. 4, the change of the eigenvalues calculated through the eigenvalue deposition and the change of variables $\eta_n$ calculated in the weight derivation process almost coincide with each other. Therefore, in the invention, the weight calculation method compares the variable $\eta_n$ to the threshold "1" in each stage to monitor its variation, and stops the shift to the next stage at the time when the variable $\eta_n$ becomes smaller than the threshold "1". In this manner, applying the present invention to the calculation method enables automatically deciding the number of the processing stages which has been decided in accordance with the eigenvalue of the variable.

Thus, by use of the weight calculation method of the invention deciding the number of stages automatically on the basis of the variable calculated in the weight derivation process, the time required for calculation may be shortened.

FIG. 5 is a block diagram to illustrate one embodiment of the weight calculation device regarding the invention. In FIG. 5, the numeric FIG. 11 indicates a CPU (central processing unit), the CPU 11 is connected to a ROM for storing program 13, to a data input/output interface (I/O) 14, and to a RAM for temporarily storing data 15 via a bus 12. An MWF weight calculation program based on the flowchart shown in FIG. 3 is stored in the ROM 13, and when a processing start is instructed, the CPU 11 loads the calculation program from the ROM 13. The CPU 11 takes in the data through the interface 14 to temporarily store it in the RAM 15, appropriately reads out the data therefrom, and executes the MWF weight calculation processing depicted in FIG. 3 to output the obtained weight calculation result from the interface 14.

The above configured weight calculation device of the invention using the weight calculation method regarding the invention makes it possible to make the processing amount smaller, therefore, the calculation device may shorten the time period for the weight calculation. Therefore, the invention employs the weight calculation device for the adaptive array antenna to make the array antenna to perform weight calculation for inputs and outputs to and from each antenna element. Thereby, since the time period for the weight calculation has been shortened, the weight calculation device is enabled to form an excellent composite beam for a short time period.

In the meantime, the adaptive array antenna has been applied to a radar device, such as a composite opening radar device to capture a target. Therefore, applying the weight calculation device of the present invention to the adaptive array antenna in the given manner enables to form the composite beam in a short time period, so that the radar devise using such an antenna makes it possible to more quickly acquire the target.

Figure 6:
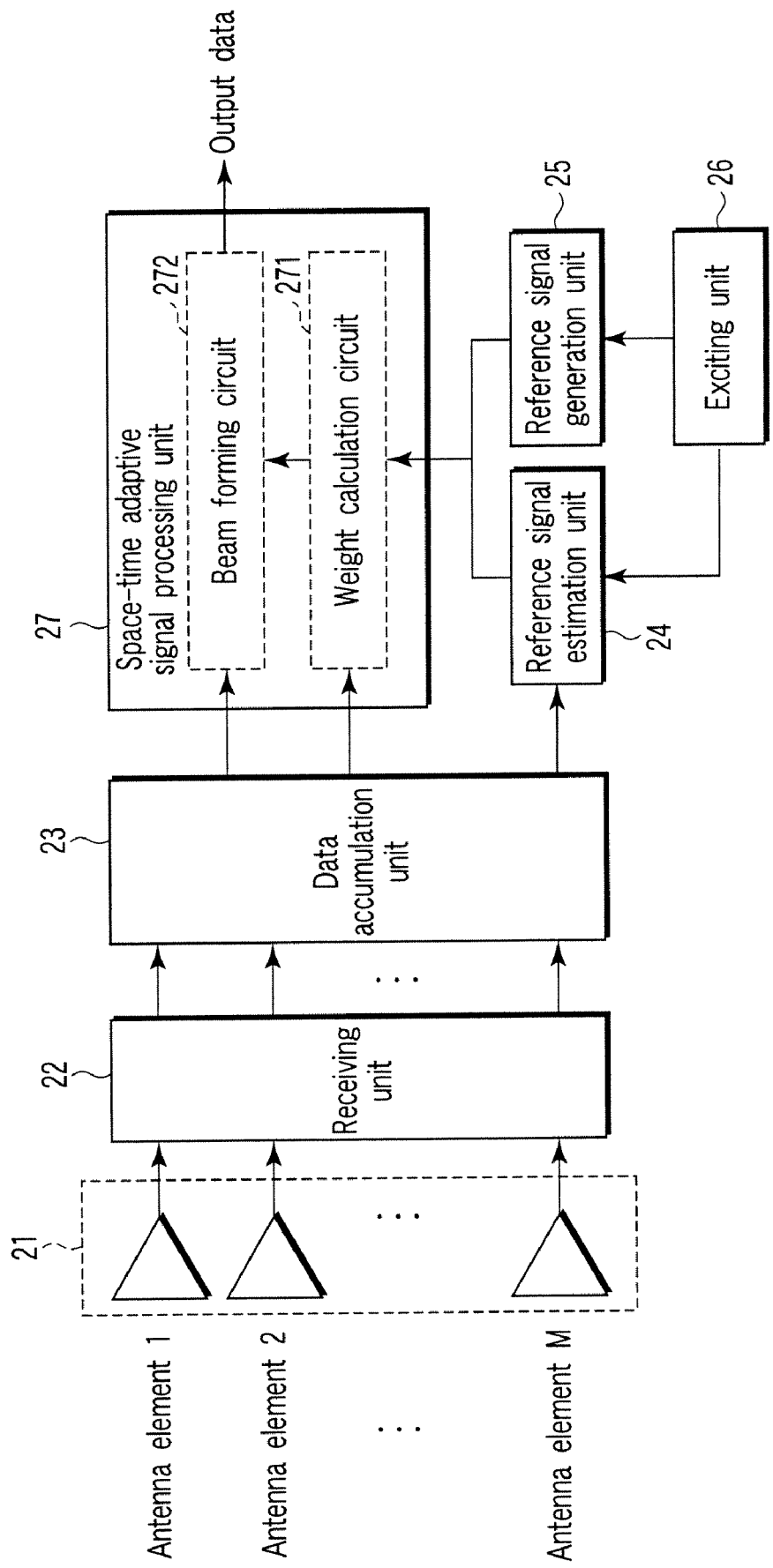

As for an example of the foregoing radar device, FIG. 6 illustrates a schematic block configuration of the radar device having the weight calculation device built-into the STAP with the invention applied thereto. In FIG. 6, the numeric FIG. 21 indicates an adaptive array antenna to receive target reflection signals of radar pulses by means of M pieces of antenna elements. Each element output from the antenna 21 is reception-detected by a receiving unit 22 to be transmitted to a data accumulation unit 23. The data accumulation unit 23 prepares, in advance, storage areas corresponding to processing range cells of lengths equivalent to prescribed ranges, and it sequentially stores the input data in storage areas of the corresponding cell positions in accordance with the reception timing.

Herein, some of the antenna element outputs are sent to a reference signal estimation unit 24 to be used as reference amplitudes and phases of the reception signal. An exciting unit 26 periodically excites the reference signal estimation unit 24 and a reference signal generation unit 25. The exciting unit 26 estimates and generates a reference signal to perform the weight calculation for each range cell equivalent to the prescribed ranges.

The accumulated data in the data accumulation unit 23 is sent to a space-time adaptive signal processing unit 27. The processing unit 27, in a weight calculation circuit 271, calculates a covariance matrix from data of the range cells except for the range cells in which it is presumed that the target signals are each included, namely from data of cells in which it is supposed that they are formed only of spurious elements. For the last time, a beam forming circuit 272 applies the weight control to the antenna reception signal by means of the adaptive weight calculated on the basis of the covariance matrix to form output data.

The weight control in the STAP system with the foregoing configuration performs weight calculation for each range cell in a weight calculation circuit 271 in order to calculate adaptive weight. The calculation circuit 271 employs the weight calculation method given above, in other words, it employs the method of automatically deciding the number of processing stages by means of the variable $\eta_n$ calculated in the weight derivation process. Thereby, it is possible for the weight control to increase a calculation speed.

The invention is not limited to the specific details and representative embodiments shown and described herein, and in an implementation phase, various types of modifications may be made without departing from the spirit or scope of the general inventive concept of the invention. Various types of the invention can be formed by appropriately combining a plurality of constituent elements disclosed in the foregoing embodiments. Some of the elements, for example, may be omitted from the whole of the constituent elements shown in the embodiments mentioned above. The constituent elements over different embodiments further may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A weight calculation method for performing weight control for a target reflection signal to form a reception composite beam, the method, comprising:

storing the target reflection signal of a radar pulse received via an antenna into cells corresponding to positions in accordance with a reception timing for a plurality of processing range cells having lengths equivalent to prescribed ranges on a time axis;

calculating weights by stage for a phase and amplitude of the target reflection signal to form the reception composite beam so that arrival directions of spurious elements become zero to an arrival direction of the target reflection signal by using values stored in the plurality of processing cells; and performing weight control of the target reflection signal using the weights to form and output the reception composite beam, wherein the calculating of the weights monitors a change of specific variables indicating correlation values among stages in the plurality of processing stages to stop a shift to the next processing stage at the time when the variables exceed a reference value.

2. The weight calculation method according to claim 1, wherein
the calculating of the weights employs a multistage wiener filter system, calculates a covariance matrix from data of cells which are supposed to be formed only of spurious elements, calculates adaptive weights on the basis of the covariance matrix, and monitors changes of the specific variables for each processing stage.

3. A weight calculation device, comprising:
a storage unit which stores a target reflection signal of a radar pulse received via an antenna at corresponding cell positions in accordance with a reception timing to a plurality of processing range cells having lengths equivalent to prescribed ranges on a time axis; and
a weight calculation unit which calculates weights by stage for a phase and amplitude of the target reflection signal to form a reception composite beam so that arrival directions of spurious elements become zero to an arrival direction of the target reflection signal by using values stored in the plurality of processing cells, wherein
the weight calculation unit monitors a change of specific variables indicating correlation values among stages in the plurality of processing stages to stop a shift to the next processing stage at the time when the variables exceed a reference value.

4. The weight calculation device according to claim 3, wherein
the weight calculation unit employs a multistage wiener filter system, calculates a covariance matrix from data of cells which are supposed to be formed only of spurious elements, calculates adaptive weights on the basis of the covariance matrix, and monitors a change of specific variables for each processing stage.

5. The weight calculation device according to claim 3, wherein
the weight calculation unit calculates the weights in use of a reference signal or estimated reference signal corresponding to the target reflection signal.

6. An adaptive array antenna which arranges a plurality of element antennas in an array form and is directivity-controlled in an arbitrary direction to receive a target reflection signal of a radar pulse, comprising:
a storage unit which stores the target reflection signal at positions of corresponding cells in accordance with a reception timing for a plurality of processing range cells having lengths equivalent to prescribed ranges on a time axis;
a weight calculation unit which calculates weights by stage for a phase and amplitude of the target reflection signal to form a reception composite beam so that arrival directions of spurious elements become zero to an arrival direction of the target reflection signal by using values stored in the plurality of processing cells; and
a beam forming unit which takes in the adaptive weights, and performs weight control for the target reflection signal in use of the adaptive weights to form the reception composite beam.

7. A radar device, comprising:
an adaptive array antenna which arranges a plurality of element antennas in an array form and is directivity-controlled in an arbitrary direction to receive a target reflection signal of a radar pulse;
a weight calculation unit which stores the target reflection signal at positions of corresponding cells in accordance with a reception timing for a plurality of processing range cells having lengths equivalent to prescribed ranges on a time axis, calculates weights by stage for a phase and amplitude of the target reflection signal to form a reception composite beam so that arrival directions of spurious elements become zero to an arrival direction of the target reflection signal by using values stored in the plurality of processing cells, monitors a change of specific variables indicating correlation values among stages at each of the plurality of processing stages, and stops a shift to the next stage at the time when the variables exceed a reference value to obtain adaptive weights; and
a signal processing unit which detects a target from the target reflection signal to which weight control is applied by the adaptive array antenna.

8. The radar device according to claim 7, wherein
the signal processing device detects a shape of a target from the target reflection signal.

* * * * *